Dec. 18, 1962  R. H. CURTIS  3,069,616
VOLTAGE REGULATOR FOR GENERATORS
Filed Aug. 5, 1958

INVENTOR.
Reid H. Curtis
BY Mueller & Aichele
Attys.

United States Patent Office

3,069,616
Patented Dec. 18, 1962

3,069,616
VOLTAGE REGULATOR FOR GENERATORS
Reid H. Curtis, Lombard, Ill., assignor to Motorola, Inc., Chicago, Ill., a corporation of Illinois
Filed Aug. 5, 1958, Ser. No. 753,236
5 Claims. (Cl. 322—25)

This invention relates to voltage regulators and more particularly to voltage regulators employing transistors as control elements and effective to control the voltage output of a generator by controlling the current through the field coil thereof.

In the past, voltage regulator circuits have been provided wherein a transistor detects a deviation between output voltage and a reference voltage, amplifies this difference signal and applies it to a control transistor in a direction to substantially neutralize the deviaiton. In systems wherein a voltage is produced by a rotating element such as a generator it is quite common to have present a small alternating current ripple in the output voltage. In addition, sudden changes in load or in the speed of rotation of the generator may introduce additional alternating current components. In voltage regulator circuits which detect deviation as aforesaid the deviation detection and the subsequent amplification constitute negative feedback around the generator through its field. If high frequency alternating current components are introduced into this feedback, the reactance of the generator causes a phase shift in the alternating current components which makes the feedback in the system positive instead of negative. Introduction of positive feedback will cause the system to oscillate. Such oscillations will usually increase in amplitude until the current flowing through the field is being driven from a cutoff to a maximum value. Under these conditions, the regulator will either lose control completely, or will be only partially effective in regulating the output voltage of the generator.

In conventional regulators of the type described, there is a substantial problem in providing a sufficient operating voltage to one or more of the transistors employed. For example, a typical regulator circuit may utilize two transistors with a first common emitter stage coupled with a second common emitter stage. In such an arrangement, the total collector to emitter voltage available for the first transistor is the very small base to emitter voltage of the second transistor which is usually on the order of a few tenths of a volt. For proper operation most transistors require at least one or two volts potential difference between collector and emitter. It is especially important to provide an adequate potential difference between collector and emitter in transistors used to regulate the output voltage of relatively low voltage generators of the type commonly used in automobiles.

It is an object of the present invention to provide a reliable and effective all-electronic voltage regulator for a generator which controls the output voltage by controlling the current through the field coil of the generator.

It is a further object of the invention to provide a transistor voltage regulator which operates with a minimum amount of power consumption by the regulating elements and in which adequate operating bias is supplied to the transistor.

It is another object of the invention to provide a transistor voltage regulator wherein an error signal amplifying element is effectively stabilized against oscillation but at the same time is effective to regulate against static changes in input or load conditions.

A feature of the invention is the provision of a transistor voltage regulator which includes a pair of emitter coupled transistors as difference signal detecting and amplifying elements and thereby facilitating the application of phase compensating degenerative feedback to stabilize against oscillation.

A further feature of the invention is a transistor voltage regulator in which a comparison unit for supplying a correction signal in response to a sampled deviation signal is made up of a pair of emitter coupled transistors, one of which has its base coupled to a point of fixed potential and the other having its base coupled to a point sampling the output voltage system.

Another feature of the invention is the combination of a degenerative phase compensating feedback network including a capacitative element in circuit with the base of one of the aforesaid emitter coupled transistors to stabilize the unit against oscillation while at the same time permitting the regulator to regulate against static changes of the type caused by changes in load or generator speed.

Still another feature of the invention is a transistor arrangement which does not waste any of the available output voltage of a generator to provide adequate operating bias for the transistor.

In accordance with the invention, a voltage regulator includes a control transistor having its collector connected in series with the field coil of a generator, and with first and second comparison transistors of a type complementary to the control transistor. The comparison transistors are emitter coupled with the first transistor having its base connected to a point of fixed potential controlled by a reference voltage element and further having its collector coupled to the base of the control transistor. The second comparison transistor has its base connected to an element of a voltage divider for sampling the output voltage of the system and detects a difference signal between it and the reference voltage. The difference signal is amplified and varies the emitter current of the first comparison transistor which in turn adjusts the conductivity of the control transistor in a sense to restore the output voltage to a regulated value by controlling the current through the field coil. A degenerative feedback is effective to stabilize the comparison transistor amplifier system against oscillation but because of the capacitative element it permits the system to adjust itself to static changes in generator speed or output load.

Figure 1:
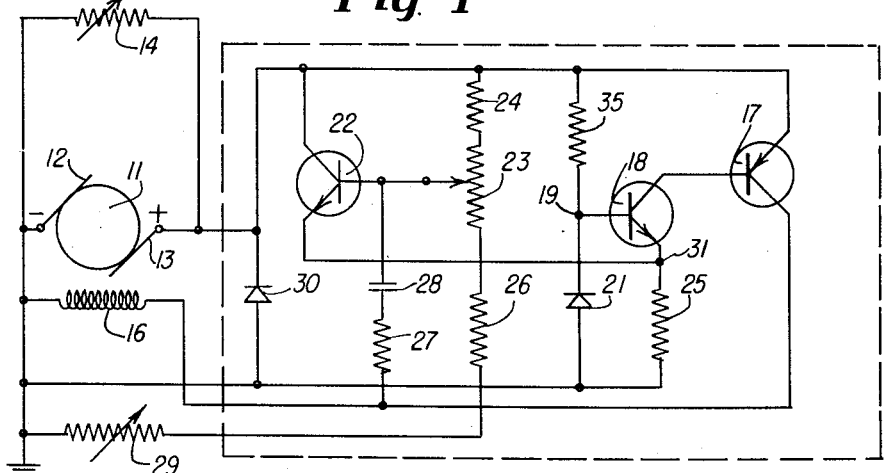
FIG. 1 is a schematic diagram showing one embodiment of the present invention which is particularly adapted for use with a hand-cranked generator.

The embodiment of the invention illustrated in FIG. 1 is particularly adapted for use in a hand crank generator. Such a generator includes the rotatable armature 11 with brushes 12 and 13 and having a load indicated by variable resistor 14 connected across them. The current is generated by rotation of the armature 11 within the field coil 16.

The regulator portion of the circuit includes the control transistor 17 connected in series with the field coil 16. In the embodiment illustrated, the control transistor is a PNP unit although NPN units may be used by making appropriate changes in the circuitry as will be explained subsequently. The control transistor 17 has its base coupled to the collector of the NPN comparison transistor 18 which has its base coupled to the point 19 which is adapted to be held at a fixed potential through the action of the Zener diode reference element 21. Bias voltage is supplied across resistor 35. The emitter of the first comparison transistor 18 is coupled to the emitter of a second NPN comparison transistor 22 with resistor 25 serving as a coupling resistor. This transistor has its base connected to the potentiometer 23 which with fixed resistors 24 and 26 and external rheostat 29 forms a voltage divider.

A degenerative feedback network made up of resistor 27 and capacitor 28 is connected between the base of transistor 22 and the collector of control transistor 17. Although control transistor 17 is shown as a PNP unit and comparison transistors 18 and 22 are of the NPN type, it will be understood that control transistor 17 may be made an NPN transistor while the comparison transistor may be of the PNP type by making appropriate changes in the polarity of various circuit elements including reversal of the Zener diode 21.

In operation of the system illustrated in FIG. 1 the armature 11 is cranked manually to generate current in the armature and build up a voltage across the load 14. As shown the diode 30 is connected in a direction to prevent reverse polarity from developing in the event the generator is turned backwards. Such reverse polarity might damage the transistors of the regulator, the load or the generator itself.

The base of the comparison transistor 22 is connected at an appropriate point on the potentiometer 23 so that it will be initially at the same potential as the base of comparison transistor 18 which is connected to the point 19 and clamped at a fixed potential by the Zener diode 21. Assume now that a drop in output voltage takes place for some reason such as a change in the value of load 14 or generator cranking speed. The potential at point 19 is fixed but the potential sampled by the base of transistor 22 will drop in proportion to the change in output voltage. This in turn causes a drop in base current of the transistor 22 and therefore decreases its emitter current. The decrease in emitter current of transistor 22 lowers the potential of the common point 31 to which the emitter of transistor 18 is connected. Since the potential of the base of transistor 18 is fixed by its connection to clamped point 19, this results in an increase in potential between the base and emitter of transistor 18 so that the emitter current and collector current thereof both increase. The base of the complementary control transistor 17 is coupled to the collector of comparison transistor 18 so that the amplified difference signal results in an increase in base current and in collector current of the control transistor. As shown the collector of control transistor 17 is coupled to the field coil 16 and the increase in collector current of transistor 17 raises the current through field coil 16 to a level that offsets the original voltage drop.

It will be apparent that the difference signal, which is the difference in potential between the respective bases of the transistors 22 and 18, is amplified and that the comparison unit made up of the two comparison transistors and the control transistor serves as an amplifier. There is, therefore, a tendency for the combination of the amplifier unit and the generator to oscillate if there are any positive feedback elements present in the circuit. To compensate for this tendency and to avoid oscillation, the negative feedback network made up of resistor 27 and capacitor 28 is provided between the collector of control transistor 17 and the base of comparison transistor 22. Thus, a portion of the control current is fed back to the base of transistor 22. This feedback is degenerative in effect since it tends to introduce a base current in the transistor 22 whose phase shift is in opposition to the sampled output voltage from the generator. However, the presence of capacitor 28 renders the feedback more or less pulsating in effect with the result that feedback tends to stabilize the entire system against instability caused by oscillation of the transistors 18 and 22. The degenerative feedback is thus not operative to prevent changes of a static nature such as changes in load resistance and hence does not effect the regulating properties of the system.

It will be apparent that the feedback network will not degrade the static regulation of the system. This is because the resistor 27 and the capacitor 28 have no effect on the static regulation.

In a specific embodiment of the invention wherein the voltage drop across the load 14 is regulated to about 6.3 volts circuit components having the following values were employed:

| | |
|---|---|
| Transistor 17 | 2N176. |
| Transistors 18 and 22 | 2N377. |
| Potentiometer 23 | 25 ohms. |
| Resistor 24 | 40 ohms. |
| Resistor 26 | 150 ohms. |
| Resistor 25 | 240 ohms (preferably substantially constant with respect to temperature). |
| Resistor 27 | 180 ohms. |
| Capacitor 28 | 15 microfarads. |
| Resistor 35 | 250 ohms. |
| Zener diode 21 | 4.7 volt drop plus or minus 5%. |
| Diode 30 | S-320-G. |
| Rheostat 29 | 25 ohms. |

Figure 2:
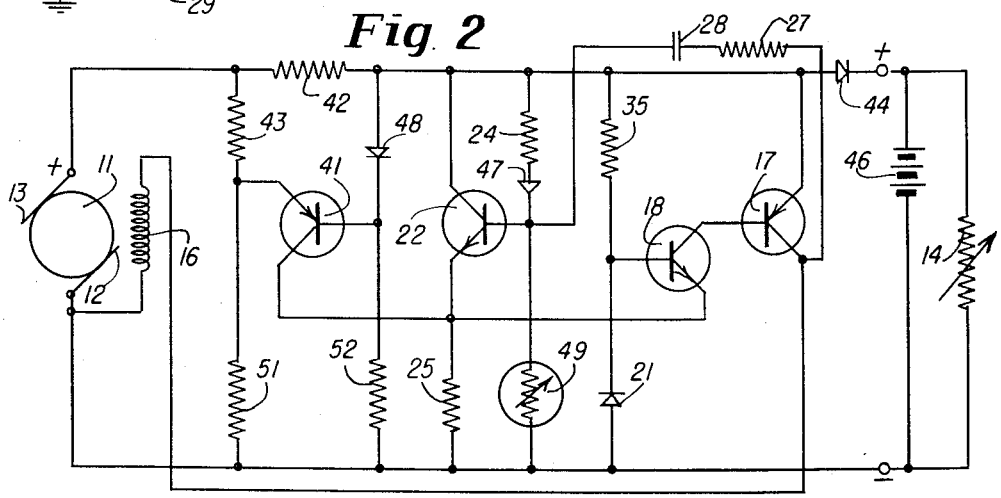
FIG. 2 is a schematic diagram of another embodiment of the invention particularly adapted for regulating the output of an automobile generator but also suitable for use with other types of rotating generators.
Figure 3:
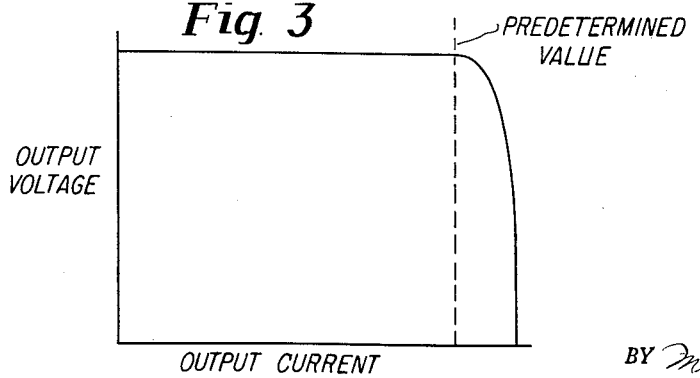
FIG. 3 is a graph showing the relation of output voltage and output current of a typical regulator in accordance with this invention.

FIG. 2 illustrates another embodiment of the invention particularly useful in regulating the voltage in vehicle systems. In FIG. 2 reference characters corresponding to those used in FIG. 1 designate corresponding components. It will be understood that the particular values of such corresponding components may be different although their function is the same in different embodiments. Thus, the regulator portion of the system includes the PNP control transistor 17 and the NPN comparison transistors 18 and 22. The system also includes a current limiting transistor 41 which is a PNP transistor normally biased to a nonconductive state by the voltage across resistor 43. A nearly steady current passes through resistors 43 and 51. When the output current through the resistor 42 reaches a predetermined value, the associated voltage drop across resistor 42, forward biases transistor 41 into conduction. The resultant collector current is coupled to the emitter of transistor 18. This changes the base current in control transistor 17 and biases it toward a nonconductive state so that the regulator effectively reduces the generator output voltage. FIG. 3 indicates this effect.

A cutout diode 44 is provided in series with the automobile battery 46 in order to prevent reverse flow of current from the battery to the generator. In order to compensate for the variation of the electrical properties of this diode with temperature a similar diode 47 biased in the same direction is provided in the base circuit of the comparison transistor 22. A diode 48 for which forward bias is provided by resistor 52 is connected in the base circuit of the current limiting transistor 41 in order to compensate for variations in the characteristics of the rectifying junctions of this transistor with temperature. Diode 48 has the same temperature characteristics as the base-emitter junction of transistor 41 so that as the voltage required to forward bias this junction changes with temperature, the voltage drop supplied across the diode for a given voltage drop across resistor 42 changes correspondingly. This renders current sensitive transistor 41 stable to temperature changes.

In FIG. 2 the base of the comparison transistor 22 is shown as connected to the positive temperature coefficient resistor 49 rather than to the manually variable potentiometer 23 of FIG. 1. In accordance with this embodiment the potential of the base of transistor 22 will change to raise the maximum current that can be fed through field coil 61 as ambient temperature drops. This maximum output voltage available will therefore be higher during cold weather when higher voltage is required to charge battery 46 than during warm weather when lower voltage is adequate.

It will be apparent that in operation of the system illustrated in FIG. 2 the circuit components common to both systems functioned in the same manner as described in connection with the discussion of the embodiment of FIG. 1 with the feedback control elements 27 and 28 effective to stabilize the system against oscillation. The emitter coupling of transistors 18 and 22 enables the current sensitive transistor 41 to be incorporated into the system without unduly complicating the design of the current.

In one embodiment of the invention as illustrated in FIG. 2, the various current components have the following values:

| Component | Value |
| --- | --- |
| Transistor 17 | 2N553. |
| Transistors 18 and 22 | 2N337. |
| Zener diode 21 | 10 volts. |
| Resistor 24 | 150 ohms. |
| Resistor 25 | 400 ohms. |
| Resistor 35 | 440 ohms. |
| Transistor 41 | 2N654. |
| Resistor 42 | 6.66 milliohms. |
| Resistor 43 | 0.40 ohm. |
| Diode 44 | 30 amps. diode 50 volts P.I.V. |
| Diode 47 | Temperature coefficient matches the temperature coefficient of diode 44. |
| Diode 48 | Temperature coefficient matches the temperature coefficient of transistor 41. |
| Resistor 49 | 400 ohms at 25° C., and having a temperature coefficient matching the battery charge voltage demanded. |
| Resistor 51 | 28.5 ohms. |
| Resistor 52 | 1500 ohms. |

The invention provides then a reliable system for voltage regulation in which power consumption by the regulating elements is kept to a minimum and in which the system is effectively stabilized against oscillations but is still capable of regulating against normal static changes.

I claim:

1. A regulator for regulating the output voltage of a generator by controlling the current in the field coil thereof including in combination, a control transistor having its emitter and collector connected in series with said field coil and across the generator output, first and second comparison transistors complementary in type to said control transistor, said first comparison transistor having its collector coupled to the base of said control transistor and its emitter coupled to the emitter of said second comparison transistor and to the generator, a reference voltage element coupled to the base of said first comparison transistor to provide a relatively constant base potential therefor, means coupling the base and emitter of said second comparison transistor to the output voltage of the generator so that changes in the output voltage are reflected as changes in the base current of said second comparison transistor which in turn changes the conductivity of said control transistor to oppose the aforesaid changes in the output voltage and a degenerative feedback network connected between said control transistor and said second comparison transistor to reduce the effect of phase shift produced by the field coil.

2. A regulator for regulating the output voltage of a generator by controlling the current in the field coil thereof including in combination, a control transistor having its collector and emitter connected in series with said field coil and across the output of said generator, first and second comparison transistors complementary in type to said control transistor, said first comparison transistor having its collector coupled to the base of said control transistor and its emitter coupled to the emitter of said second comparison transistor and to the generator, a Zener diode coupled to the generator output and the base of said first comparison transistor to provide a relatively constant base potential therefor, biasing means coupling the emitter and base of said second comparison transistor to the output voltage of the generator so that changes in such output voltage are reflected as changes in the base current of said second comparison transistor which in turn changes the conductivity of said control transistor to oppose the aforesaid changes by controlling the field current and a cutout diode adapted to be coupled in series with the generator output and a load for the generator, said biasing means including a diode having temperature characteristics matched to the temperature characteristics of said cutout diode for controlling said regulator to compensate for voltage change across said cutout diode with temperature variation.

3. A regulator for regulating the output voltage of a generator by controlling the current in the field coil thereof including in combination, input conductors of connection to the generator output voltage, a control transistor having emitter and collector connected in series with said field coil across said input conductors, first and second comparison transistors complementary in type to said control transistor, said first comparison transistor having a collector coupled to the base of said control transistor and an emitter coupled to the emitter of said second comparison transistor and to the generator, a Zener diode coupled between the base of said first comparison transistor and one of said input conductors to provide a relatively constant base potential therefor, said second comparison transistor having a collector coupled to one of said input conductors, means coupling the base of said second comparison transistor to a point the potential of which is a function of the output voltage so that changes in the output voltage are reflected as changes in the base current of said second comparison transistor which in turn are amplified by said first comparison transistor to signals which change the conductivity of said control transistor to oppose the aforesaid changes in the output voltage and a degenerative feedback network between the collector of said control transistor and the base of said second comparison transistor.

4. A regulator for regulating the output voltage of a generator by controlling the current in the field coil thereof including in combination, input conductors for connection to the generator output voltage, a control transistor having emitter and collector connected in series with said field coil across said input conductors, first and second comparison transistors complementary in type to said control transistor, said first comparison transistor having a collector coupled to the base of said control transistor and its emitter coupled to the emitter of said second comparison transistor and to the generator, a voltage divider network including a Zener diode coupled between said input conductors and connected to the base of said first comparison transistor to provide a relatively constant base potential therefor, said second comparison transistor having a collector coupled to one of said input conductors, means coupling the base of said second comparison transistor to a point the potential of which is a function of the output voltage so that changes in the output voltage are reflected as changes in the base current of said second comparison transistor which in turn are amplified by said first comparison transistor to signals which change the conductivity of said control transistor to oppose the aforesaid changes in the output voltage, and a degenerative feedback network including resistive and capacitative elements between the collector of said control transistor and the base of said second comparison transistor, the elements of said feedback network being chosen to offset a tendency for phase shift and oscillation due to signals applied to the field coil.

5. A voltage regulator circuit for a source of electrical power having a control winding for varying the output voltage thereof, including in combination, a pair of input conductors for connection to the source of power, a control transistor having emitter and collector electrodes adapted to be connected in series with said control winding across said input conductors, circuit means including comparison transistor means for sensing voltage variation of said source with respect to a substantially fixed voltage and including a collector electrode coupled to said base electrode of said control transistor and further having base and emitter electrodes, said circuit means having a voltage divider network coupled across said input conductors and connected to said base and emitter electrodes of said transistor means for controlling the same in response to variation in voltage of said source so that said control winding has a compensating current change introduced therein by said control transistor, and a cutout diode series connected with one of said input conductors, said voltage divider network including a diode poled to conduct in the forward direction and having a temperature characteristic matched to that of said cutout diode for controlling said regulator to compensate for voltage change across said output diode with temperature change.

References Cited in the file of this patent
UNITED STATES PATENTS

| | | |
|---|---|---|
| 1,353,060 | Milnor | Sept. 14, 1920 |
| 1,909,054 | Gulliksen | May 16, 1933 |
| 2,002,371 | Garman | May 21, 1935 |
| 2,759,142 | Hamilton | Aug. 14, 1956 |
| 2,809,301 | Short | Oct. 8, 1957 |
| 2,832,900 | Ford | Apr. 29, 1958 |
| 2,862,175 | Guyton et al. | Nov. 25, 1958 |
| 2,892,143 | Sommer | June 23, 1959 |